(12) United States Patent
Newman

(10) Patent No.: US 6,758,095 B2
(45) Date of Patent: Jul. 6, 2004

(54) TONGS MONITOR WITH LEARNING MODE

(75) Inventor: Frederic M. Newman, Midland, TX (US)

(73) Assignee: Key Energy Services, Inc., Midland, TX (US)

( * ) Notice: Subject to any disclaimer, the term of this patent is extended or adjusted under 35 U.S.C. 154(b) by 78 days.

(21) Appl. No.: 10/046,688

(22) Filed: Jan. 16, 2002

(65) Prior Publication Data

US 2003/0188584 A1 Oct. 9, 2003

(51) Int. Cl.[7] .................................................. G01L 7/00
(52) U.S. Cl. ............................ 73/700; 73/753; 73/756
(58) Field of Search .......................... 73/700–756, 761, 73/856

(56) References Cited

U.S. PATENT DOCUMENTS

| | | |
|---|---|---|
| 4,176,436 A | 12/1979 | McCombs et al. |
| 4,208,919 A | 6/1980 | Motsinger |
| 4,210,017 A | 7/1980 | Motsinger |
| 4,365,402 A | 12/1982 | McCombs et al. |
| 4,400,785 A | 8/1983 | Wallace et al. |
| 4,402,052 A | 8/1983 | Stone et al. |
| 4,446,745 A | 5/1984 | Stone et al. |
| 4,552,041 A * | 11/1985 | Coyle, Sr. .................... 81/470 |
| 4,592,125 A | 6/1986 | Skene |
| 4,738,145 A | 4/1988 | Vincent et al. |
| 5,502,883 A | 4/1996 | Ohmi et al. |
| 6,212,763 B1 * | 4/2001 | Newman .................... 29/702 |
| 2001/0000550 A1 | 5/2001 | Newman |

* cited by examiner

Primary Examiner—Edward Lefkowitz
Assistant Examiner—Jermaine Jenkins
(74) Attorney, Agent, or Firm—Howrey Simon Arnold & White, L.L.P.

(57) ABSTRACT

A tongs monitor for monitoring the tightening of tubing, casings, and sucker rods of a well is selectively operable in a learning mode and a monitoring mode. A target tightness value is determined during the learning mode. Subsequent tightness values are then compared to the target value. For example, a first connection is tightened in a conventional manner, while its tightness is monitored during the learning mode. If the tightening process went well, then an operator pushes a button that tells the monitor to remember how tight the first connection was tightened. The tightness value of that first joint then becomes the target tightness value for any subsequent joints. As additional joints are tightened, their tightness are monitored and compared to the first one to ensure that all the joints are as good as the first one within an allowable tolerance.

20 Claims, 3 Drawing Sheets

TONGS MONITOR WITH LEARNING MODE

BACKGROUND OF THE INVENTION

1. Field of the Invention

The subject invention generally pertains to assembling threaded sucker rods and tubulars of oil wells and other wells, and more specifically pertains to a device that monitors the operation of a set of tongs.

2. Description of Related Art

Oil wells and many other types of wells often comprise a well bore lined with a steel casing. A casing is a string of pipes that are threaded at each end to be interconnected by a series of internally threaded pipe couplings. A lower end of the casing is perforated to allow oil, water, gas, or other targeted fluid to enter the interior of the casing.

Disposed within the casing is another string of pipes interconnected by a series of threaded pipe couplings. This internal string of pipes, known as tubing, has of a much smaller diameter than casing. Fluid in the ground passes through the perforations of the casing to enter an annulus between the inner wall of the casing and the outer wall of the tubing. From there, the fluid forces itself through openings in the tubing and then up through the tubing to ground level, provided the fluid is under sufficient pressure.

If the natural fluid pressure is insufficient, a reciprocating piston pump is installed at the bottom of the tubing to force the fluid up the tubing. A reciprocating drive at ground level is coupled to operate the pump's piston by way of a long string of sucker rods that is driven up and down within the interior of the tubing. A string of sucker rods are typically comprised of individual solid rods that are threaded at each end so they can be interconnected by threaded couplings.

Since casings, tubing and sucker rods often extend thousands of feet to generally the full depth of the well, it is imperative that their respective coupling connections be properly tightened to avoid costly repair and downtime. Couplings for tubulars (i.e., couplings for tubing and casings), and couplings for sucker rods are usually tightened using tools know as tongs. Tongs vary in design to suit its particular purpose, i.e., tightening tubulars or rods, however, tongs all share a common purpose of torquing one threaded element relative to another. Tongs typically include a hydraulic motor that delivers a torque to a set of jaws that grip the element or elements being tightened.

Various control methods have been developed in an attempt to ensure that sucker rods and tubulars are properly tightened. However, properly tightened joints can be difficult to consistently achieve due to numerous rather uncontrollable factors and widely varying specifications of tubulars and sucker rods. For instance, tubing, casings and sucker rods each serve a different purpose, and so they are each designed with different features having different tightening requirements.

But even within the same family of parts, numerous variations need to be taken into account. With sucker rods, for example, some have tapered threads, and some have straight threads. Some are made of fiberglass, and some are made of stainless steel. Some are a half-inch in diameter, and some are over an inch in diameter. With tubing, some have shoulders, and some do not.

And even for a given part, other conditions may vary. For instance, when tightening the first few sucker rods at the beginning of a day, the hydraulic fluid driving the tongs may be relatively cool and viscous. Later in the day, the hydraulic fluid may warm up, which may cause the tongs to run faster. The hydraulic fluid changing temperature or changing from one set of tongs to another may result in inconsistent tightening of the joints. Even supposedly identical tongs of the same make and model may have different operating characteristics, due to the tongs having varying degrees of wear on their bearings, gears, or seals. Also, the threads of some sucker rods may be more lubricated than others. Some threads may be new, and others may be worn. These are just a few of the many factors that need to be considered when tightening sucker rods and tubulars.

It can be very difficult to provide a control method for tongs that takes into consideration all the various factors that affect the process of tightening tubulars and sucker rods. Since many factors cannot be readily quantified by those who specify the torque to which a particular part should be tightened, specifying a particular torque is risky.

Consequently, a need exists for a control or monitoring system that adapts to various conditions at a well site where sucker rods, casings, or tubing are being tightened.

SUMMARY OF THE INVENTION

To provide a monitor or control system that adapts to various conditions at a well site where sucker rods, casing, or tubing is being tightened, it is an object of the invention to provide such a system with a learning mode wherein the system develops a target tightness value based on tightening a particular connection.

Another object of some embodiments of the invention is to provide a monitor system that allows an operator to determine when a set of tongs is turned on and off, rather than being determined by an automatic control.

Another object is to provide a monitor or control system that includes a time delay as a way of factoring in the effects of wind loading.

Yet another object is to provide a monitor or control system that can be used when tightening sucker rods, casing, and tubing.

A further object of the invention is to provide a monitor system for threaded tubulars and sucker rods, wherein an operator does not have to enter a predetermined target tightness value.

A still further object is to provide a monitor or control system that does not need to know the size, grade, or other design specifications of the tubular or sucker rod being tightened.

Another object is to provide a monitor system that does not need to know what type of tongs is being monitored.

These and other objects of the invention are provided by a monitor for tongs that includes a learning mode and a monitoring mode. Tightness readings taken during the monitoring mode are compared to a target tightness value established during the learning mode.

DESCRIPTION OF THE PREFERRED EMBODIMENT

Figure 1:
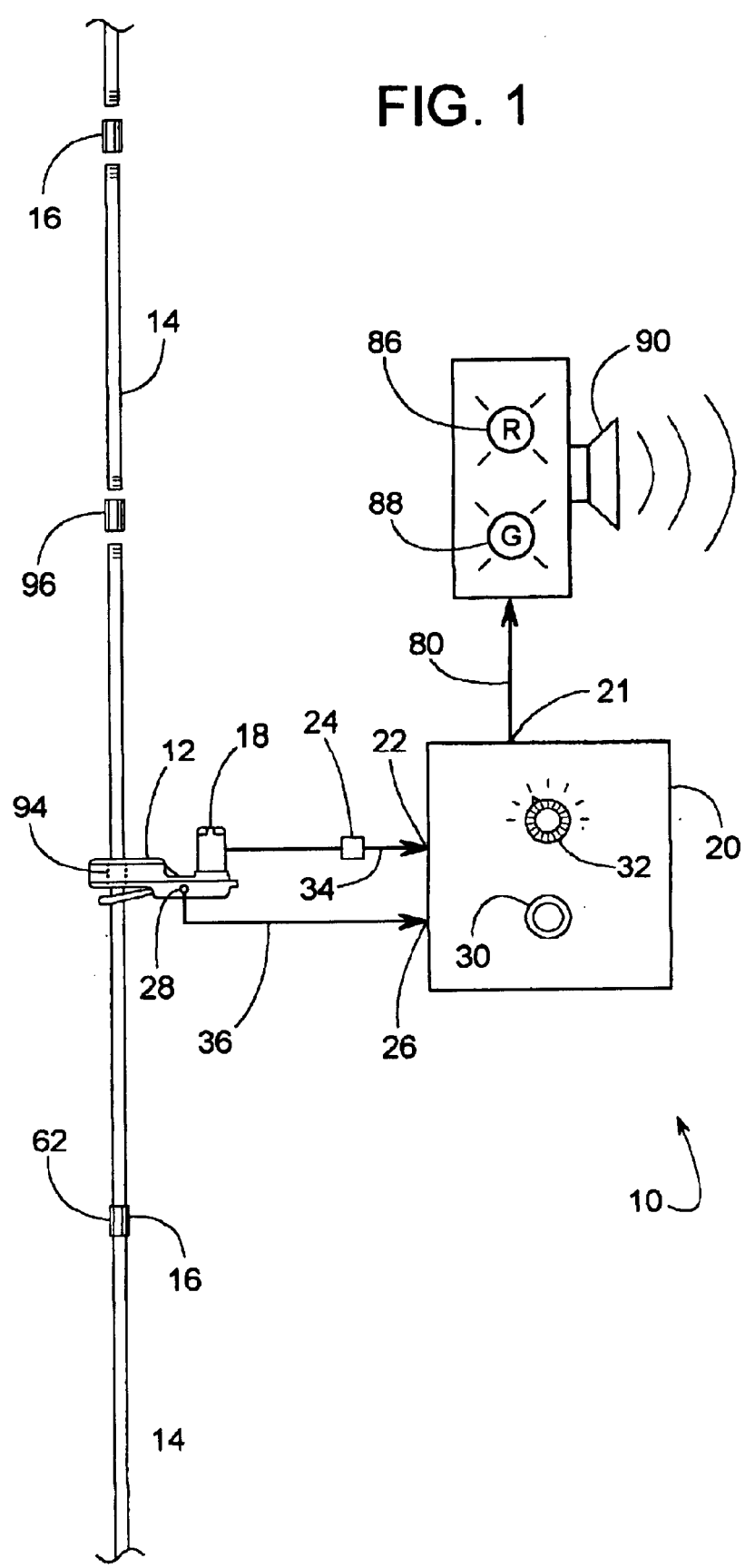
FIG. 1 is a schematic diagram of a system that monitors a set of tongs tightening a string of elongated members.

A monitor 10 for monitoring the tightening operation of a set of tongs 12 is shown in FIG. 1. Monitor 10 includes a learning mode that enables the monitor to adapt to various tongs and operating conditions. After temporarily operating in the learning mode, monitor 10 shifts to a monitoring mode. Readings taken during the monitoring mode are compared to those taken during the learning mode to determine whether any changes occur during the tightening operation.

Tongs 12 are schematically illustrated to represent various types of tongs including, but not limited to, those used for tightening sucker rods, tubing or casings. In FIG. 1, tongs 12 are shown used in assembling a string of elongated members 14, which are schematically illustrated to represent any elongated member with threaded ends for interconnecting members 14 with a series of threaded couplings 16. Examples of elongated members 14 include, but are not limited to sucker rods, tubing, and casings. Tongs 12 include at least one set of jaws for gripping and rotating one elongated member 14 relative to another, thereby screwing at least one elongated member into an adjacent coupling 16. A drive unit 18 drives the rotation of the jaws. Drive unit 18 is schematically illustrated to represent various types of drive units including those that can move linearly (e.g., piston/cylinder) or rotationally and can be powered hydraulically, pneumatically or electrically.

In a currently preferred embodiment, monitor 10 comprises an electrical circuit 20 that is electrically coupled to an output 21 and four inputs. Electrical circuit 20 is schematically illustrated to represent any circuit adapted to receive a signal through an input and respond through an output. Examples of circuit 20 include, but are not limited to, computers, programmable logic controllers, circuits comprising discrete electrical components, circuits comprising integrated circuits, and various combinations thereof.

The inputs of circuit 20, according to some embodiments of the invention, include a first input 22 electrically coupled to a first sensor 24, a second input 26 electrically coupled to a second sensor 28, a learn input 30, and a tolerance input 32. However, it should be noted that monitors with fewer inputs or with inputs other than those used in this example are well within the scope of the invention.

In response to the rotational action or tightening action of tongs 12, sensors 24 and 28 provide input signals 34 and 36 respectively. The term, "rotational action" refers to any rotational movement of any element associated with a set of tongs. Examples of such an element include, but are not limited to, gears, jaws, sucker rods, couplings, and tubulars. The term, "tightening action" refers to an effort applied in tightening a threaded connection. Sensors 24 and 28 are schematically illustrated to represent a wide variety of sensors that respond to the rotational or tightening action of tongs 12. Examples of sensors 24 and 28 include, but are not limited to a pressure sensor (e.g., for sensing hydraulic pressure of a hydraulic motor); strain gage (e.g., for sensing strain as the tongs exert torque) limit switch (e.g., used as a counter for counting passing gear teeth or used in detecting a kickback action of the tongs as it begins tightening a joint); hall effect sensor, proximity switch, or photoelectric eye (e.g., used as a counter for counting passing gear teeth); and a current sensor (e.g., for measuring the power or electrical current delivered to an electric motor that in cases where an electric motor serves as the tongs' drive unit).

Learn input 30 and tolerance input 32 are user interface elements that allow a user to affect the operation of monitor 10 in ways that will be explained later.

Figure 2:
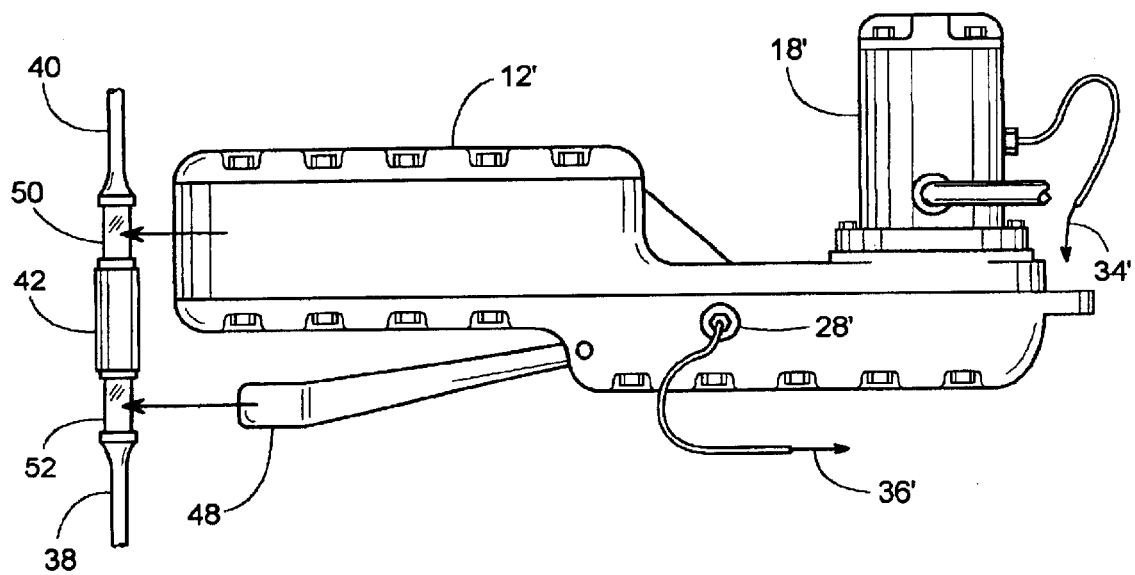
FIG. 2 is a side view of a set of tongs about to tighten two sucker rods into a coupling.
Figure 3:
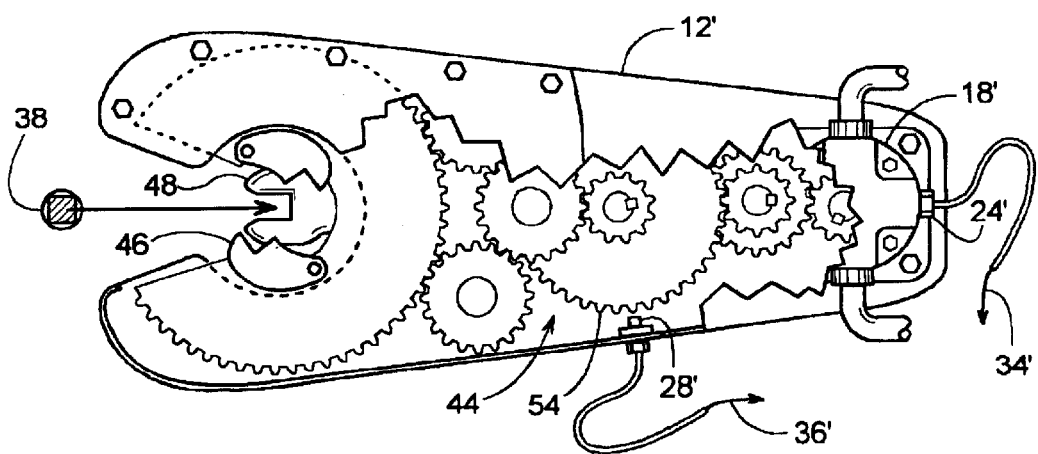
FIG. 3 is a cut-away top view of the tongs of FIG. 2.

For illustration, monitor 20 will be described with reference to a set of sucker rod tongs 12' used for screwing two sucker rods 38 and 40 into a coupling 42, as shown in FIGS. 2 and 3. However, it should emphasized that monitor 20 can be readily used with other types of tongs for tightening other types of elongated members. In this example, a hydraulic motor 18' is the drive unit of tongs 12'. Motor 18' drives the rotation of various gears of a drive train 44, which rotates an upper set of jaws 46 relative to a lower set of jaws 48. Upper jaws 46 are adapted to engage flats 50 on sucker rod 40, and jaws 48 engage the flats 52 on rod 38. So, as jaws 46 rotate relative to jaws 48, upper sucker rod 40 rotates relative to rod 38, which forces both rods 38 and 40 to tightly screw into coupling 42.

In the example of FIGS. 2 and 3, sensor 24' is a conventional pressure sensor in fluid communication with motor 18' to sense the hydraulic pressure that drives motor 18'. The hydraulic pressure increases with the amount of torque exerted by tongs 12', so sensor 24' provides an input signal 34' that reflects that torque. Sensor 28', in this particular example, is a conventional Hall effect sensor that generates a pulse with every gear tooth 54 that rotates past sensor 28'. The pulses provide an input signal 36' that monitor 20 counts to obtain an indication of how far jaws 46 rotates. Although either input signal 34' or 36' alone can provide an indication of the tightening action of tongs 12', in a preferred embodiment of the invention, both signals 34' and 36' are used to provide an even more accurate idea of how well a connection is tightened.

Figure 4:
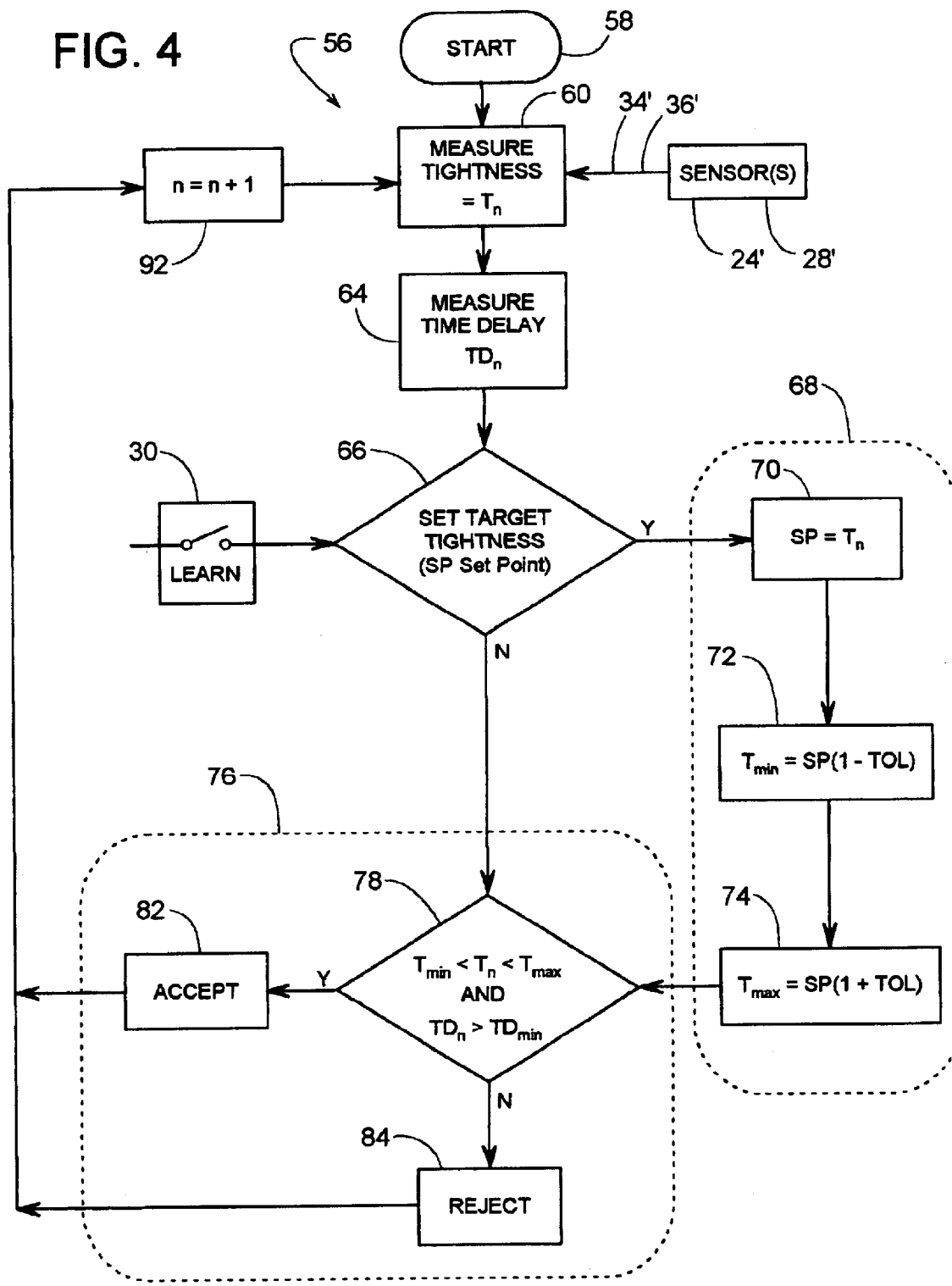
FIG. 4 in algorithm for a tongs monitor that illustrates a method of tightening a plurality of joints during a monitoring mode of the tongs monitor and comparing their tightness values to that of a target value determined during a learning mode of a tongs monitor.

More specifically, monitor 20 generally follows a control algorithm 56 of FIG. 4. After starting in block 58, control block 60 directs monitor 20 to interpret input signals 34' and 36' to determine the tightness of a first connection 62 (FIG. 1). Connection 62 may be tightened in any conventional manner, such as performing the following sequencial steps: manually engaging tongs 12' with sucker rods 38 and 40, operating a manual trigger to start motor 18', and manually releasing the trigger when tongs 12' appears to have stalled.

During the tightening process, monitor 20 calculates a tightness value, Tn. Tn could simply be the final torque or pressure as sensed by sensor 24'. However, in a preferred, more accurate method, Tn is determined based on the relative angular rotational displacement of two sucker rods being turned into a common coupling. To disregard any rotation prior to the connection reaching its shoulder point (e.g., the point at which the connection becomes hand-tight or begins to strain), monitor 20 only counts pulses from sensor 28' after the torque, as measured by sensor 24', excedes a predetermined minimum threshold. After reaching the shoulder point, monitor 20 counts gear tooth pulses until the the tongs' trigger is released manually or automatically.

In control box 20, monitor 64 measures a TDn, which is the amount of time that Tn was above a set point or target tightness value. Since such a set point has not yet been determined, the value of the measured time delay is currently meaningless.

A setpoint or target tightness value can be set by control block 66. For example, if the operator is satisfied with how the first connection 62 was just tightened, the operator may activate learn input 30, which can simply be a push button or some other appropriate input device. Activating learn input 30 places monitor 20 in a learning mode 68 where in block 70 a setpoint SP is assigned the most recent value of Tn, which in this case is the tightness of first connection 62. Next, in blocks 72 and 74, a Tmin and a Tmax are defined as the SP plus or minus a TOL tolerance value. The TOL tolerance value specifies an allowable tolerance range for the target tightness value. The TOL value may be +5%, 10% or any other desired tolerance chosen by the user. The user enters the desired TOL value through tolerance input 32, which may be a dial, keyboard, selector push buttons, etc. In a currently preferred embodiment, tolerance input 32 is a two-position toggle switch, wherein one position the toggle switch sets the tolerance to 5% and the other position sets the tolerance to 10%.

Next, control transfers from the learning mode in block 74 to a monitoring mode 76 in block 78. Here, if Tn is within the allowable range between Tmin and Tmax, and if Tn was within that range for a duration or time delay TDn that excedes a predetermined or user selectable minimum duration TDmin, then block 82 creates an output signal 80 on output 21 to indicate that the connection is acceptable. The actual value of TDmin can be a predetermined value stored in monitor 20, or may be a user selectable value entered by yet another input of monitor 20. TDmin may help offset the negative effects of wind acting on the sucker rod and other conditions that might create a momentary spike in torque.

If control block 78 determines that Tn is beyond the allowable range of Tmin to Tmax, or if Tn was not within that range a duration of TDmin, then block 84 creates an output signal 80 on output 21 that indicates the connection is unacceptable. The signal for acceptable or unacceptable connections may be visable, such as a red light 86 for unacceptable and a green light 88 for acceptable. The output signal may also be an audible alarm, such as a horn 90.

From blocks 82 or 84, control shifts to block 92 where "n" is indexed for the next connection 94. As an operator tightens connection 94, block 60 senses its tightness value Tn, which will be a number of pulses past the shoulder point. The duration over which Tn was above TDmin is noted in block 64. By not activating learn input 30, block 66 transfers control to block 78 of monitoring mode 76. If Tn is between Tmin and Tmax, and if Tn was within that range for a duration of at least TDmin, then block 82 causes green light 88 to come on momentarily. If, however, Tn is beyond the allowable range of Tmin to Tmax, or if Tn was not within that range a duration of TDmin, then block 84 turns on red light 86. Afterwards, control returns to block 92 to again index "n" for the next connection 96.

This cycle continues for as long as the operator desires. At any time, however, the operator may choose to reset the target tightness setpoint SP to another Tn value by simply reactivating learn input 30.

Although the invention is described with reference to a preferred embodiment, it should be appreciated by those skilled in the art that various modifications are well within the scope of the invention. For example, instead of one red light 86 and one green light 88, two like sets of red and green lights can be connected to monitor 20. One red/green set of lights could indicate whether an acceptable amount of torque has been applied to a joint (e.g., as sensed by sensor 24'), and the other set of red/green lights could indicate whether the joint has undergone a proper degree of rotation (e.g., as sensed by sensor 28'). Two sets of lights for distinguishing between torque and rotation helps in identifying the source of a problem when the tongs fail to properly tighten a joint. Therefore, the scope of the invention is to be determined by reference to the claims that follow.

I claim:

1. A monitor for tongs that undergoes a rotational action to provide a tightening action, comprising:
    a sensor adapted to be coupled to the tongs and being adapted to provide an input signal in response to the tightening action of the tongs;
    an input electrically coupled to the sensor; and
    an electrical circuit electrically coupled to the input for receiving the input signal, wherein the electrical circuit varies a target tightness value based on the input signal, and wherein the electrical circuit compares the input signal to the target tightness value.

2. The monitor of claim 1, wherein the sensor is a pressure sensor adapted to be in fluid communication with the tongs.

3. The monitor of claim 1, wherein the sensor is a counter adapted to detect the rotational action of the tongs.

4. The monitor of claim 1, wherein the sensor includes an electrical current sensor.

5. The monitor of claim 1, wherein the target tightness value is based on torque exerted by the tongs.

6. The monitor of claim 1, wherein the target tightness value is based on rotational displacement associated with the tongs.

7. The monitor of claim 1, further comprising an output electrically coupled to the electrical circuit, wherein the electrical circuit provides at the output an output signal in response to the input signal being within a predetermined range of the target tightness value.

8. The monitor of claim 7, wherein the output signal is visible.

9. The monitor of claim 7, wherein the output signal is audible.

10. The monitor of claim 7, wherein the output signal is provided in response to the input signal being within a predetermined range of the target tightness value for a predetermined time delay.

11. A monitor for tongs that undergoes a rotational action to provide a tightening action for sequentially tightening a first joint and a second joint, comprising:
    a sensor adapted to be coupled to the tongs and being adapted to provide a first input signal in response to the tongs tightening the first joint, and being adapted to provide a second input signal in response to the tongs tightening the second joint;
    an input electrically coupled to the sensor;
    an electrical circuit electrically coupled to the input for receiving the first input signal and the second input signal, wherein the electrical circuit varies a target tightness value based on the first input signal, and wherein the electrical circuit compares the second input signal to the target tightness value; and
    an output electrically coupled to the electrical circuit, wherein the electrical circuit provides at the output an output signal in response to the second input signal being within a predetermined range of the target tightness value.

12. The monitor of claim 1, wherein the sensor is a pressure sensor adapted to be in fluid communication with the tongs.

13. The monitor of claim 11, wherein the sensor is a counter adapted to detect the rotational action of the tongs.

14. The monitor of claim 1, wherein the sensor includes an electrical current sensor.

15. The monitor of claim 1, wherein the target tightness value is based on torque exerted by the tongs.

16. The monitor of claim 1, wherein the target tightness value is based on rotational displacement associated with the tongs.

17. The monitor of claim 7, wherein the output signal is visible.

18. The monitor of claim 7, wherein the output signal is audible.

19. The monitor of claim 7, wherein the output signal is provided in response to the second input signal being within a predetermined range of the target tightness value for a predetermined time delay.

20. A method of monitoring the tightening a plurality of joints after tightening a first joint, comprising:
   tightening the first joint;
   determining a target tightness value by monitoring the tightening of the first joint;
   tightening the plurality of joints;
   redetermining the target tightness value by monitoring the tightening of each of the plurality of joints; and
   comparing to the target tightness value an extent to which each joint of the plurality of joints is tightened.

* * * * *

UNITED STATES PATENT AND TRADEMARK OFFICE
CERTIFICATE OF CORRECTION

PATENT NO. : 6,758,095 B2 Page 1 of 1
DATED : July 6, 2004
INVENTOR(S) : Newman

It is certified that error appears in the above-identified patent and that said Letters Patent is hereby corrected as shown below:

<u>Column 6,</u>
Lines 54, 56 and 58, cancel "claim 1" and insert -- claim 11 --.
Lines 61, 63 and 65, cancel "claim 7" and insert -- claim 1 --.

Signed and Sealed this

First Day of February, 2005

JON W. DUDAS
*Director of the United States Patent and Trademark Office*